United States Patent
Namou et al.

(10) Patent No.: US 9,376,024 B2
(45) Date of Patent: Jun. 28, 2016

(54) SCALABLE HIGH VOLTAGE CHARGING AND DETECTION SYSTEM FOR PLUG-IN ELECTRIC VEHICLES

(71) Applicant: GM GLOBAL TECHNOLOGY OPERATIONS LLC, Detroit, MI (US)

(72) Inventors: Andrew J. Namou, West Bloomfield, MI (US); James E. Tarchinski, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 683 days.

(21) Appl. No.: 13/760,805

(22) Filed: Feb. 6, 2013

(65) Prior Publication Data
US 2014/0217814 A1    Aug. 7, 2014

(51) Int. Cl.
| | |
|---|---|
| *B60L 11/00* | (2006.01) |
| *B60L 3/00* | (2006.01) |
| *B60L 3/04* | (2006.01) |
| *B60L 11/18* | (2006.01) |
| *H02H 3/05* | (2006.01) |
| *H02H 9/02* | (2006.01) |

(52) U.S. Cl.
CPC .............. *B60L 11/00* (2013.01); *B60L 3/0023* (2013.01); *B60L 3/0092* (2013.01); *B60L 3/04* (2013.01); *B60L 11/18* (2013.01); *H02H 3/05* (2013.01); *H02H 9/02* (2013.01); *B60L 2240/547* (2013.01); *Y02T 10/7005* (2013.01); *Y02T 90/14* (2013.01)

(58) Field of Classification Search
CPC .................. B60R 16/033; B60R 16/00; B60R 16/005–16/0215; B60R 16/023; B60R 16/0235; B60R 16/0239; B60R 16/03; B60R 16/04; B64D 41/00–41/007; B60L 1/00–1/20
See application file for complete search history.

(56) References Cited

U.S. PATENT DOCUMENTS

| | | | | |
|---|---|---|---|---|
| 7,242,196 | B2* | 7/2007 | Yudahira | B60L 3/0023 324/418 |
| 8,502,409 | B2* | 8/2013 | Kato | B60L 3/0069 307/10.6 |
| 2010/0133029 | A1* | 6/2010 | Moran | H01M 8/04089 180/65.265 |
| 2012/0105065 | A1 | 5/2012 | Namou et al. | |
| 2012/0191294 | A1* | 7/2012 | Boiron | G01R 31/3278 701/33.8 |

FOREIGN PATENT DOCUMENTS

| | | |
|---|---|---|
| JP | 2013-9552 A | 1/2013 |
| WO | WO 96/28872 A1 | 9/1996 |

* cited by examiner

*Primary Examiner* — Kenneth B Wells
*Assistant Examiner* — Rafael Pacheco
(74) *Attorney, Agent, or Firm* — John A. Miller; Miller IP Group, PLC

(57) ABSTRACT

A high-voltage relay system for a vehicle. The system includes a high-voltage bus, a parallel relay set and a controller. The parallel relay set includes two or more relays wired in parallel and that are electrically coupled to the high-voltage bus. The controller is programmed to adjust the power flowing through the parallel relay set when a malfunction is detected in one of the relays in the set. The system can include a high-voltage power source electrically coupled to the high voltage bus through the parallel relay set, where the controller reduces the power flowing through the parallel relay by reducing output of the high-voltage power source. The system can include a high-voltage motor electrically coupled to the high voltage bus through the parallel relay set, where the controller reduces the power flowing through the parallel relay set by reducing the motor's power demands.

20 Claims, 5 Drawing Sheets

SCALABLE HIGH VOLTAGE CHARGING AND DETECTION SYSTEM FOR PLUG-IN ELECTRIC VEHICLES

BACKGROUND OF THE INVENTION

1. Field of the Invention

This invention relates generally to a high-voltage parallel relay system in vehicles, and, more particularly, to a high-voltage parallel relay system that adjusts the power flow through a parallel relay set when a fault is detected in one of the relays in the set.

2. Discussion of the Related Art

Electric and electric hybrid vehicles include relays that are often electromechanical devices that use an electromagnetic coil to move a contact system into a conducting (closed) position. The relays are often used in a charging circuit and in a propulsion circuit for conducting electricity to and from a high-voltage bus for a high-voltage battery.

The relays employed in electric vehicles are usually sized for the peak rate of the high-voltage battery. The peak rate is the peak charging rate for the charging circuit and the maximum load that the electric propulsion unit can place on the high-voltage battery for a given time. For example, an electric car may have a charging maximum of ten amps at 300 volts, so about 3 kilowatts. There will typically be a relay connected to the positive terminal of the battery and a relay connected to the negative terminal of the battery. When engineering work begins on a new electric or electric hybrid vehicle, the new vehicle is likely to have a different peak rate than the vehicles that have been designed previously, because of the rapidly evolving technology. Therefore, a new relay will need to be developed that can perform at the new peak rate. Furthermore, with the advent varying degrees of hybridization, for example, start and stop electric hybrid vehicles, there may be a plethora of high-voltage power bus needs all generating unique relay requirements. This is different from the low voltage side of the vehicle where the relays have been standardize for many years, for example, at 5, 10, 15, 20 or 40 amps at 12 volts.

There has been a desire in the automotive industry to commonize a set of high-voltage relays. However, because the technology keeps changing, it has not been practical to know what the design criteria would be for all of the high-voltage relays needed in the future. Engineers have discussed the use of lower-current high-voltage relays that are connected in parallel. Parallel relays have certain advantages, particularly, the amount of power that each relay needs to accommodate would be reduced, which allows the relay design to be simpler and less expensive. Also, by using relays electrically coupled in parallel, a new single high-voltage relay would not need to be designed for each new vehicle. Instead, once the peak power for the new vehicle is known, then the appropriate number of lower-current high-voltage relays could be wired in parallel for the new vehicle.

One problem associated with using multiple relays electrically coupled in parallel has been the condition that if one of the relays experiences a fault, then the entire parallel group of relays may fail to function as a result of its particular design. If the damaged relay is stuck open, then the remaining relays have to handle more power, which may tend to overheat the other relays possibly causing them to become stuck closed. If the damaged relay is stuck closed, which is the more likely scenario (being welded shut, due to the high voltages and elevated power levels), then the system loses the ability to control either the battery's charging or discharging (propulsion). Therefore, relay designs generally increase the structure and durability of one large relay, which tends to increase cost, and provides a single point of failure, which leaves the system susceptible to a 'walk home' condition.

In addition, there is a proliferation of charging requirements starting with various countries having different A/C power; for example, the United States uses 120 volts while Europe uses 220 volts. Different countries are putting different rules in place for faster charging of vehicles, like three phase charging. Therefore, if different relays were developed, such as one for each country, region, or power level stage for various vehicles, then there would be a need to develop, validate and maintain many different relays.

What is needed is a way to take advantage of parallel relays without the undesirable consequences of a complete failure if one of the lower-current, high-voltage relays in a parallel set fails.

SUMMARY OF THE INVENTION

In accordance with the teachings of the present invention, a high-voltage relay system for a vehicle is disclosed. The system includes a high-voltage bus, a parallel relay set and a controller. The parallel relay set includes two or more relays electrically coupled in parallel and that are electrically coupled to the high-voltage bus. The controller is capable of adjusting the power flowing through the parallel relay set when a malfunction is detected in one of the relays in the set. The system can include a high-voltage power source electrically coupled to the high voltage bus through the parallel relay set, where the controller reduces the power flowing through the parallel relay by reducing the output of the high-voltage power source. The system can include a high-voltage motor electrically coupled to the high voltage bus through the parallel relay set, where the controller reduces the power flowing through the parallel relay set by reducing the motor's power demands, or similarly reduces a high-voltage heating system or auxiliary power system (DC/DC converter) power demands.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system for regulating power to a set of high-voltage relays is merely exemplary in nature, and is in no way intended to limit the invention or its applications or uses.

Figure 1:
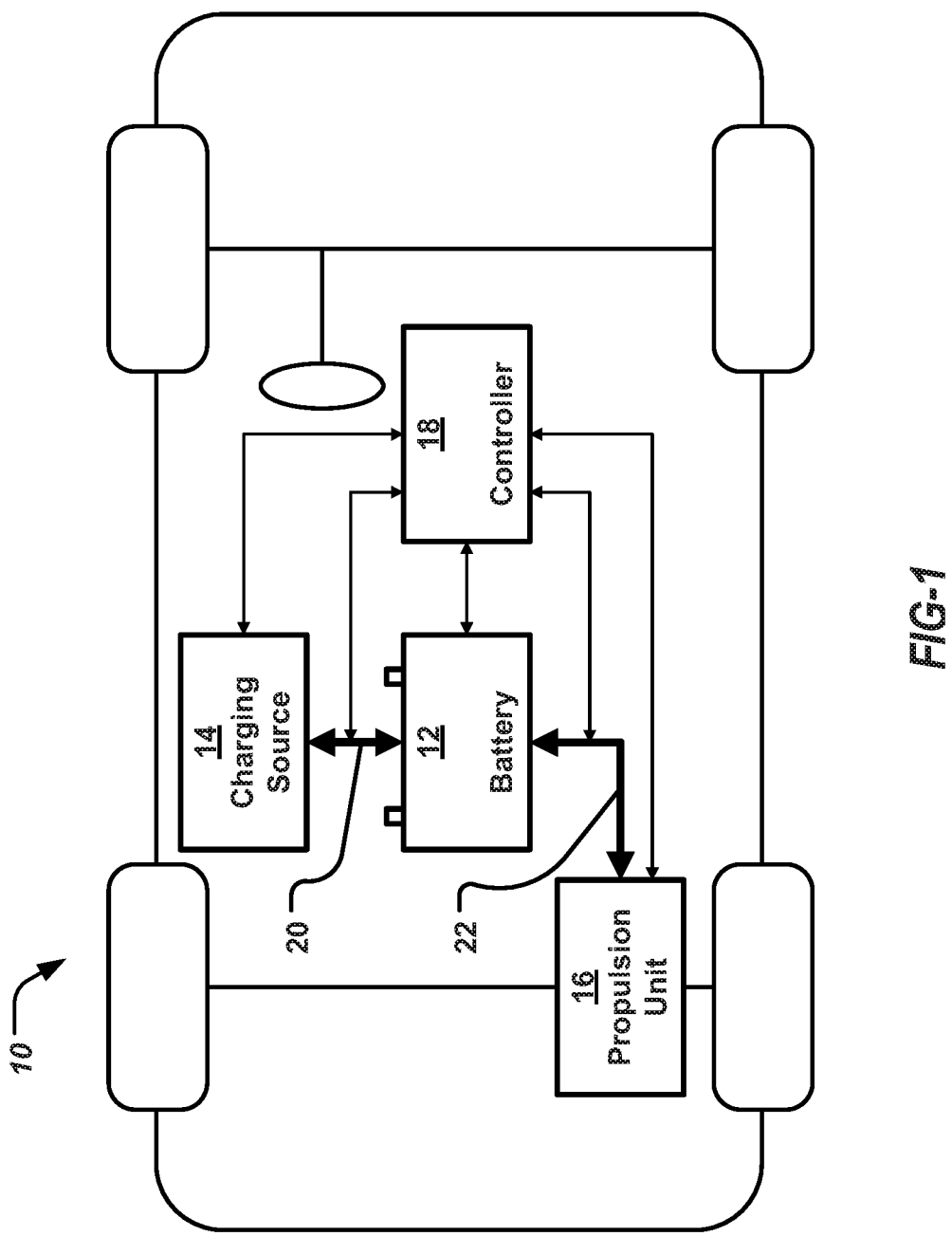
FIG. 1 is a simplified plan view of a hybrid vehicle.

FIG. 1 is a simplified plan view of a hybrid electric vehicle 10 that includes a high-voltage battery 12, a charging source 14, a propulsion unit 16 and a controller 18. The propulsion unit can be a traction inverter system with electric motors. The charging source 14 charges the high-voltage battery 12 through a charging circuit 20. The high-voltage battery 12 provides electricity to the propulsion unit 16 through a propulsion circuit 22. The controller 18 represents all of the control modules and devices necessary for the operation and control for power flowing from the charging source 14 through the charging circuit 20 to the battery 12 and then through the propulsion circuit 22 to the propulsion unit 16. The charging source 14 can be a generator coupled to an internal combustion engine, a fuel cell or electricity from an A/C power grid, for example, a standard wall socket. In one embodiment, the controller 18 may include a vehicle integration control module having one or more subordinate control modules, such as, but not limited to, a high-voltage battery controller, Battery System Module (BSM), etc. The controller 18 can detect and adjust for a malfunction in a standard scalable high-voltage relay, as will be discussed below. One of ordinary skill in the art would understand that the specific configuration of the vehicle 10 is for illustration purposes only and that many different configurations can be used to implement the systems and algorithms disclosed in this specification.

As will be discussed below, the charging circuit 20 and the propulsion circuit 22 each include a parallel relay set of standard scalable high-voltage (SSHV) relays. The SSHV relays can be any electromechanical device or solid-state device capable of creating an electrical connection when signaled. Often the electromechanical relay will have a coil with a single or dual throw switch. The parallel relay set of SSHV relays allows for higher stages of power to be achieved while using an already engineered, and verified SSHV relay that is available 'off the shelf'. The parallel relay set of SSHV relays can be used for various loads and modes of operation. The concern of losing a parallel relay set when a single SSHV relay malfunctions is remedied by the detection of the status of individual relays. If a SSHV relay is found to be faulty (either stuck open or closed), then the controller 18 can take remedial action, such as adjusting the vehicle's load/charging system to a lower power level until the parallel relay set function is restored. Because there is less current flowing through each SSHV relay the demand on the SSHV relay's contacts is reduced. This approach prevents a complete failure of the high-voltage system if a conventional single large high-voltage relay fails. Instead, the parallel set of SSHV relays yields a more fault tolerant system that provides the vehicle an extended usage mode to use until repairs are complete.

Figure 2:
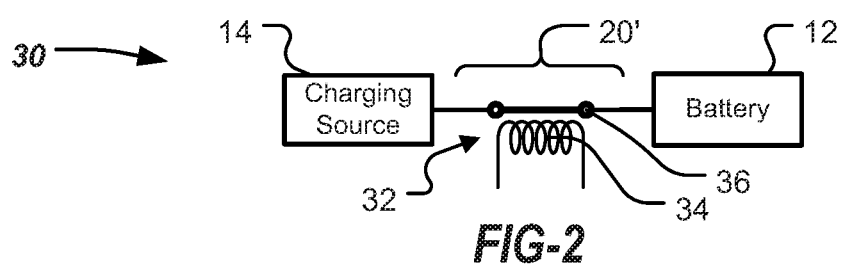
FIG. 2 is an illustration of a charging system with a single high-voltage relay.

FIG. 2 is an illustration of a charging system 30 where like elements to the block diagram vehicle 10 in FIG. 1 are identified with the same reference numbers. The charging system 30 includes a charging circuit 20', where the charging circuit 20' is controlled by a single high-voltage relay 32 including a coil 34 and a switch 36, and where the switch 36 is shown in the closed position for charging the battery 12 from the charging source 14.

Figure 3:
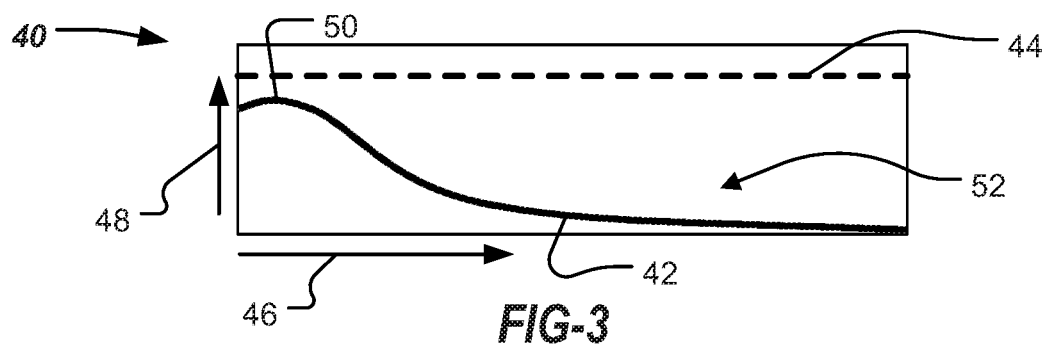
FIG. 3 is a charging current graph showing current demand and capacity over time at startup using the charging system from FIG. 2.

FIG. 3 is a charging current graph 40 with time on the horizontal axis 46 and current on the vertical axis 48 showing charging of the system 30. The charging current graph 40 shows a relay rated current capacity 44 of the relay 32 and a charging curve 50. The charging current graph 40 shows that the charging curve 42 varies over time, where the single high-voltage relay current capacity 44 exceeds a maximum charging-point 50 by a smaller amount than later in the lower charging region 52 of the charging current graph 40.

Figure 4:
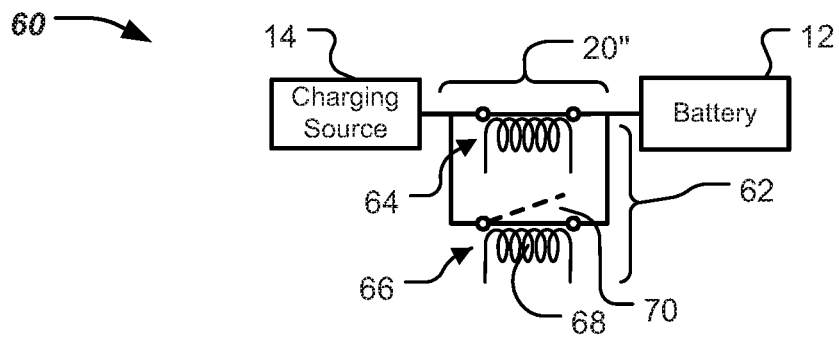
FIG. 4 is an illustration of a charging system with a parallel relay set.

FIG. 4 is an illustration of a charging system 60, where like elements to the charging system 30 are identified with the same reference numbers. The charging system 60 includes a charging circuit 20'' that has a parallel relay set 62 with two parallel SSHV relays 64 and 66 that charge the high-voltage battery 12 from the charging source 14. The SSHV relays 64 and 66 can be any kind of relay and are shown for illustrative purposes only as electromechanical relays with coils 68 and mechanical switches 70.

Figure 5:
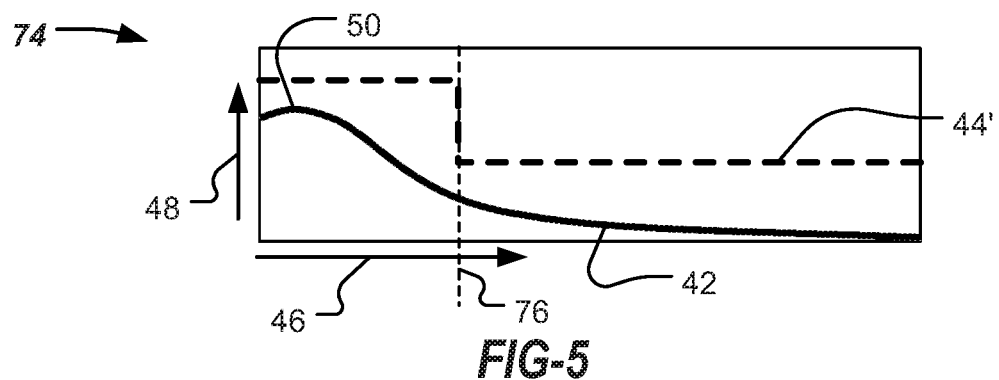
FIG. 5 is a graph showing current demand and capacity over time at startup for the charging system from FIG. 4.

FIG. 5 is a charging current graph 74 showing charging of the charging system 60, where like elements to the graph 40 are identified with the same reference numbers. At the beginning (at the left side of the graph) both of the SSHV relays 64 and 66 are closed when the charging current is at its maximum 50. Once the charging current has reduced, then the controller 18 at time 76 opens the relay 66 and the charging current only passes through the relay 64. When looking at the graph 74 it can be seen from the relay's rated charging current 44' that the parallel relay set 62 uses the two SSHV relays 64 and 66 more efficiently, and that the SSHV relays 64 and 66 do not have to accommodate as much current as the traditional single large high-voltage relay 32.

Figure 6:
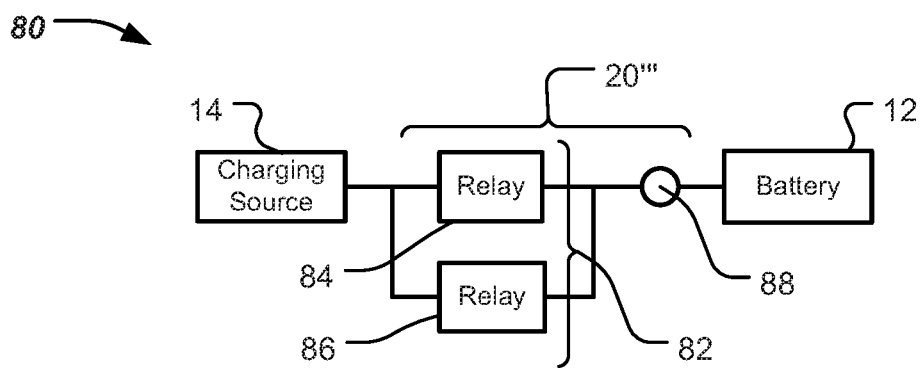
FIG. 6 is an illustration of a charging system with a parallel relay set and a high-voltage sensor.

FIG. 6 is an illustration of a charging system 80, where like elements to the charging system 30 are identified with the same reference numbers. The charging system 80 includes a charging circuit 20''' that has a parallel relay set 82 with two parallel solid-state SSHV relays 84 and 86 that charge the high-voltage battery 12 from the charging source 14. The SSHV relays 84 and 86 can be any kind of relay and are shown for illustrative purposes only as solid-state SSHV relays. A high-voltage sensor 88 senses the voltage and can be used to detect if the SSHV relays 84 and 86 are functioning properly.

Because the controller 18 can detect the status of the SSHV relays 64 and 66 in the parallel relay set 62, the overall system has more flexibility and reliability. Prior to the invention, the lack of ability to detect failed relays made it impractical to place high voltage relays in parallel.

Figure 7:
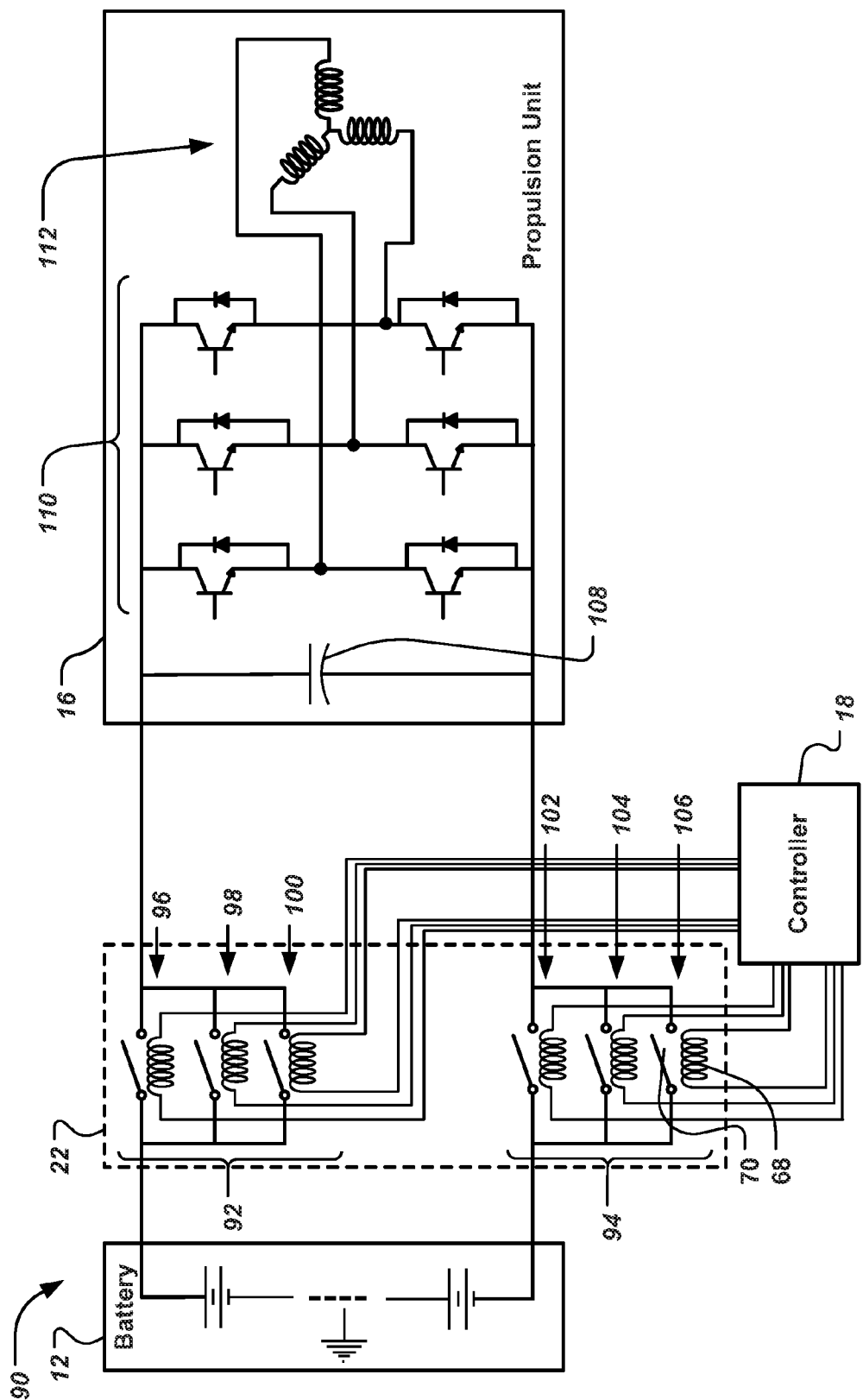
FIG. 7 is a schematic diagram of a circuit that can be used to practice the invention.

FIG. 7 shows a schematic diagram of a parallel relay set controller circuit 90, where like elements to the vehicle 10 shown in FIG. 1 are identified with same reference numbers, and where the coil 68 and the switch 70 are identified with the same reference numbers shown in FIG. 4. The parallel relay set controller circuit 90 includes the battery 12 that powers the propulsion circuit 22 that drives the propulsion unit 16. The propulsion unit 16 includes a capacitor 108 and a three-phase inverter 110 that powers a motor 112. The propulsion circuit 22 also includes a positive parallel relay set 92 including SSHV relays 96, 98 and 100 and a negative parallel relay set 94 including SSHV relays 102, 104 and 106. The SSHV relays 96-106 can be any kind of relay and are shown for illustrative purposes only as electromechanical relays with coils 68 and mechanical switches 70. The controller 18 detects the status of the relays 96, 98, 100, 102, 104 and 106 and makes adjustments to the power demands of the propulsion unit 16 if any of the SSHV relays 96-106 are not performing properly. This design allows for the number of SSHV relays energized in the propulsion circuit 22 to increase and decrease in conjunction with the power demands. For example, in the case of the propulsion unit 16, more power is needed when the vehicle 10 is accelerating and less power is needed when the vehicle 10 is slowing down. If the status of the relay 96 is detected as "stuck open," then the controller 18 could reduce the power demand that the propulsion unit 16 can place on the battery 12 by one third. This approach can provide a limp-home mode of operation for the vehicle 10 when there is a relay failure.

Although FIG. 7 depicts the propulsion circuit 22 in the parallel relay set controller circuit 90, this is only for illustrative purposes in that the parallel relay sets 92 and 94 could be used in the charging circuit 14, a high-voltage heating system, a high-voltage auxiliary power (DC/DC Converter) or any circuit of the high-voltage system.

Figure 8:
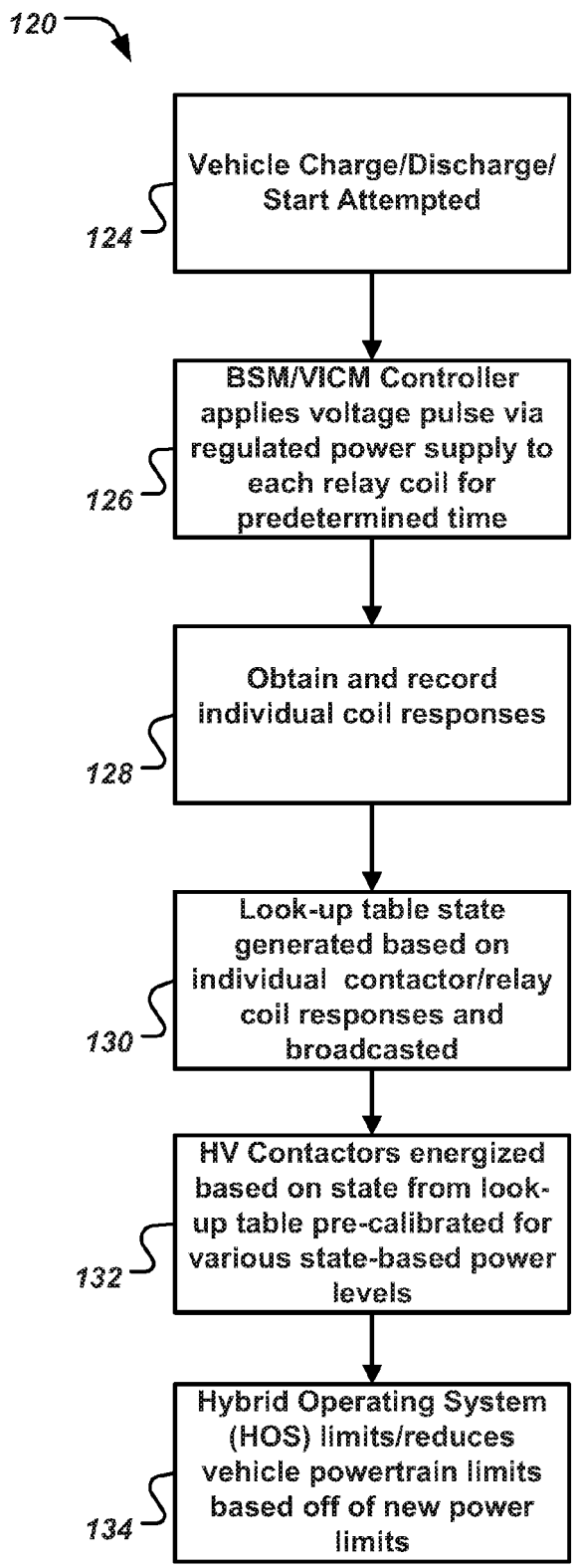
FIG. 8 is a flowchart of one possible embodiment of a control algorithm.

FIG. 8 is a flowchart 120 of one possible algorithm that the controller 18 could use. The flowchart 120 starts at box 124 when the controller 18 receives a request to charge or discharge the battery 12. Next, at box 126, the controller 18 determines the status of all the SSHV relays.

There are various ways for the controller 18 to determine the status of a SSHV relays. One way to determine if a electromechanical relay is operating property is to measure impedance of the relay's coil and from the impedance detect if the relay is stuck in an open or closed position, as described in U.S. patent application Ser. No. 13/198,340 titled "Diagnosis of HEV/EV battery disconnect system," hereby incorporated by reference in its entirety. One advantage of testing with the coil inductance is that it does not require intrusion on the high-voltage bus, which can be costly. Thus, the coil inductance testing provides lower system cost, higher performance and more fault tolerance.

Another way of detecting the status of the SSHV relays, which would work with solid-state relays, would be to have voltage-detecting circuits on the high-voltage side of the relay switch and monitor the voltage after the relay is energized and see if the voltage changes appropriately.

The SSHV relay can provide high-voltage power leads and contacts to the coil to close and open the high-voltage contacts. The controller 18 can send a signal to the relay's coil to detect its impedance and interpret the results to determine the status of the relay as described above. An alternative embodiment would be to have the relay detect the impedance of the coil and determine the status of the switch (e.g. operating properly, stuck etc.), and then the relay would communicate the status to the controller 18.

Next, at box 128, the controller 18 receives the response from the individual relay coils and determines the status of the relays. One particular algorithm that the controller 18 could use is to assign a status code of 1 or 0. If the relay is functioning properly, then it is assigned a 1. If the relay is not functioning properly, then it is assigned a 0. The 0 can mean the relay is stuck open or stuck closed.

At box 130, the controller 18 uses lookup Table 1 to determine the power level for charging or discharging. Table 1 uses the status of three high-voltage relays (SSHV relay 1, SSHV relay 2 and SSHV relay 3) to lookup a power level. The power level can range from 3 for the highest power to 0 for no power.

TABLE 1

Power State lookup based on Relay Status

| SSHV Relay 1 | SSHV Relay 2 | SSHV Relay 3 | Power Level |
|---|---|---|---|
| 0 | 0 | 0 | 0 |
| 0 | 0 | 1 | 1 |
| 0 | 1 | 0 | 1 |
| 0 | 1 | 1 | 2 |
| 1 | 0 | 0 | 1 |
| 1 | 0 | 1 | 2 |
| 1 | 1 | 0 | 2 |
| 1 | 1 | 1 | 3 |

Next, at box 132, the high-voltage relays that are properly working are energized. Finally, at box 134 the controller 18 limits or reduces the vehicle 10 charging or propulsion based on the power level.

Many other control algorithms for adjusting the power flowing through a parallel relay set are possible. One of ordinary skill in the art would readily see how alternatives, modifications and variations can be made to the control algorithm. For example, an alternative to the algorithm above would be to differentiate the 0 status code based on if stuck open or stuck closed, with this further distinction the control algorithm could become more refined.

Using the information about SSHV relay status, the controller 18 can make adjustments to the power that will be flowing through the parallel relay set. For example, if it is determined that a charging SSHV relay is stuck with one throw of a dual throw relay welded in the closed position (so that it is an open circuit), then the stuck open relay can be skipped, the remaining good relays can be engaged and the output from the charging source 14 can be limited.

Using this approach, if there are two SSHV relays in the parallel relay set and one fails, then the controller 18 can provide a reduced capacity mode to a "limp home". A common capability for hybrid/electric vehicles is the ability to control the charging rate and the propulsion power demand. If only one relay is available, then telling the charging source 14 and/or the electric propulsion unit 16 to reduce power, and adjusting the parallel relay set, can provide continued operation of a vehicle in a reduced capacity mode. For example, in the case where there are two SSHV relays in the parallel relay set, then if the normal peak current was 10 amps, the controller 18 could limit the peak charging to half of that (i.e. 5 amps).

Many charging systems start with a constant current charging mode and then go into a constant voltage charging mode. The controller 18 could adjust the parallel relay set to an appropriate current capacity based on if the controller 18 is charging in the constant current mode (higher power, i.e. more SSHV relays) or the constant voltage mode (lower power, i.e. less SSHV relays).

The SSHV relays with fault detection enables scaling. By having the design option of a parallel relay set, once the requirements for a new electric vehicle are determined, then the number and size of SSHV relays in parallel can be set appropriately to meet the electrical design requirements of the new vehicle.

The parallel relay set with SSHV relays and fault detection allows for unique provisioning of each new vehicle while maintaining a common design footprint. The SSHV parallel relay set allows for the use of multiple, smaller, validated parts in place of one larger uniquely designed unit for the new vehicle. For example, if a vehicle can demand 6.6 kilowatts then two parallel SSHV relays could be used, and then if only 3.3 kilowatt of power is needed only a single SSHV relay could be engaged.

The SSHV relays in parallel with fault detection improves the system's ability to deal with hardware failures. For example, if the Battery Electronic Vehicle charge contactor fails it does not result in a dead car or a walk-home situation, rather it results in a longer charge time or reduced vehicle speeds. If the relay fails in the propulsion circuit, then the vehicle can still move but under reduced power. This is significantly better then the single large relay where a single relay failure could mean the vehicle driver has to walk home.

The parallel relay set of SSHV relays also provides energy savings because of the reduced contactor coil current during low-power operation, since there are a smaller relay coil to keep energized.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

Give all terms used in the claims their broadest reasonable construction and their ordinary meaning as understood by those skilled in the art. Use of the singular articles such as "a", "the", "said", etc. should be read to recite one or more of the indicated elements.

What is claimed is:

1. A high-voltage relay system in a vehicle comprising:
a high-voltage bus;
a parallel relay set including two or more relays electrically coupled in parallel and electrically coupled to the high-voltage bus; and
a controller programmed to detect a malfunction in at least one relay of the parallel relay set and in response to the malfunction adjusts the power flowing through the parallel relay set by either adjusting the output of a power source or adjusting the power demand that is drawing power across the parallel relay set.

2. The system of claim 1 where the at least one relay includes a coil and where the controller detects the malfunction of the relay by measuring the inductance of the coil.

3. The system of claim 1 further comprising a high-voltage sensor that provides a measurement of the voltage at a high-voltage switch of the at least one relay, where the controller detects the malfunction by changes in the measurement of the voltage.

4. The system of claim 1 where the at least one relay includes a switch and where the controller detects the malfunction as the switch being stuck closed.

5. The system of claim 1 where the at least one relay includes a switch and where the controller detects the malfunction as the switch being stuck open.

6. The system of claim 1 where the controller reduces the power flowing through the parallel relay set when the malfunction is detected.

7. The system of claim 1 where the relays in the parallel relay set are designed for 1 Kilowatt or more of power.

8. The system of claim 1 further comprising a high-voltage power source electrically coupled to the high voltage bus through the parallel relay set, where the controller adjusts the power being supplied across the parallel relay set by adjusting an output of the power source.

9. The system of claim 8 where the controller reduces the power output of the power source.

10. The system of claim 1 further comprising a motor electrically coupled to the high voltage bus through the parallel relay set, where the controller adjusts the power demand that is drawing power across the parallel relay set by adjusting the power demand of the motor.

11. The system of claim 10 where the controller reduces the power demand of the motor.

12. The system of claim 1 where the high-voltage bus has voltage higher than 60 Volts.

13. A high-voltage relay system in a vehicle comprising:
a high-voltage bus;
a parallel relay set including two or more relays electrically coupled in parallel and electrically coupled to the high-voltage bus;
a high-voltage power source electrically coupled to the high voltage bus through the parallel relay set; and
a controller programmed to detects a malfunction in at least one relay of the parallel relay set and in response to the malfunction adjusts the power flowing through the parallel relay by adjusting the output of the power source.

14. The system of claim 13 where the controller reduces the power output of the power source.

15. The system of claim 13 where the relays in the parallel relay set are designed for 1 Kilowatt or more of power.

16. The system of claim 13 where the high-voltage bus has voltage higher than 60 Volts.

17. A high-voltage relay system in a vehicle comprising:
a high-voltage bus;
a parallel relay set including two or more relays electrically coupled in parallel and electrically coupled to the high-voltage bus;
a motor electrically coupled to the high voltage bus through the parallel relay set; and
a controller programmed to detect a malfunction in at least one relay of the parallel relay set and in response to the malfunction adjusts the power flowing through the parallel relay by adjusting the power demanded by the motor.

18. The system of claim 17 where the controller reduces the power demand of the motor.

19. The system of claim 17 where the relays in the parallel relay set are designed for 1 Kilowatt or more of power.

20. The system of claim 17 where the high-voltage bus has voltage higher than 60 Volts.

* * * * *